(12) United States Patent
Bhorania et al.

(10) Patent No.: US 9,626,679 B2
(45) Date of Patent: Apr. 18, 2017

(54) AUTOMATED FRAUD DETECTION FOR POINT-OF-SALE DEVICES

(71) Applicant: Square, Inc., San Francisco, CA (US)

(72) Inventors: Jevin Bhorania, San Mateo, CA (US); Aimal Mehrabi, San Francisco, CA (US)

(*) Notice: Subject to any disclaimer, the term of this patent is extended or adjusted under 35 U.S.C. 154(b) by 0 days.

(21) Appl. No.: 14/292,098

(22) Filed: May 30, 2014

(65) Prior Publication Data

US 2015/0348040 A1 Dec. 3, 2015

(51) Int. Cl.
G06Q 20/00 (2012.01)
G06Q 20/22 (2012.01)
G06Q 20/40 (2012.01)
G06Q 20/20 (2012.01)

(52) U.S. Cl.
CPC ......... *G06Q 20/4016* (2013.01); *G06Q 20/20* (2013.01)

(58) Field of Classification Search
None
See application file for complete search history.

(56) References Cited

U.S. PATENT DOCUMENTS

| | | |
|---|---|---|
| 6,330,546 B1 | 12/2001 | Gopinathan et al. |
| 8,036,938 B2 | 10/2011 | Clouthier et al. |
| 8,165,938 B2 | 4/2012 | Monk |
| 8,751,315 B2* | 6/2014 | Fisher .............. G06Q 20/20 705/16 |
| 2007/0055439 A1 | 3/2007 | Denker et al. |
| 2014/0019274 A1 | 1/2014 | Hardin et al. |
| 2014/0046844 A1 | 2/2014 | Grigg |
| 2014/0114840 A1* | 4/2014 | Arnold .............. G06Q 20/22 705/39 |

FOREIGN PATENT DOCUMENTS

WO 2013/045743 A2 4/2013

OTHER PUBLICATIONS

International Search Report and Written Opinion for International Application No. PCT/US2015/033339, mailed on Aug. 21, 2015.

\* cited by examiner

*Primary Examiner* — Paul Danneman
(74) *Attorney, Agent, or Firm* — Lee & Hayes, PLLC

(57) ABSTRACT

Techniques and arrangements for detecting potentially fraudulent transactions made on a point-of-sale (POS) device. In some instances, the POS device may upload a batch of authorization requests corresponding to transactions made on the POS device while the POS device was in an offline mode. A payment service may receive this batch and, as opposed to processing the entire batch, may select a subset for processing. After selecting the subset, the payment service may attempt to authorize payment instruments associated with each transaction of the subset. The payment service may then compare an amount of declined payment instruments to a threshold. If the amount is greater than the threshold, then the payment service may flag the subset and/or the batch as fraudulent and may refrain from processing further transactions of the batch.

20 Claims, 5 Drawing Sheets

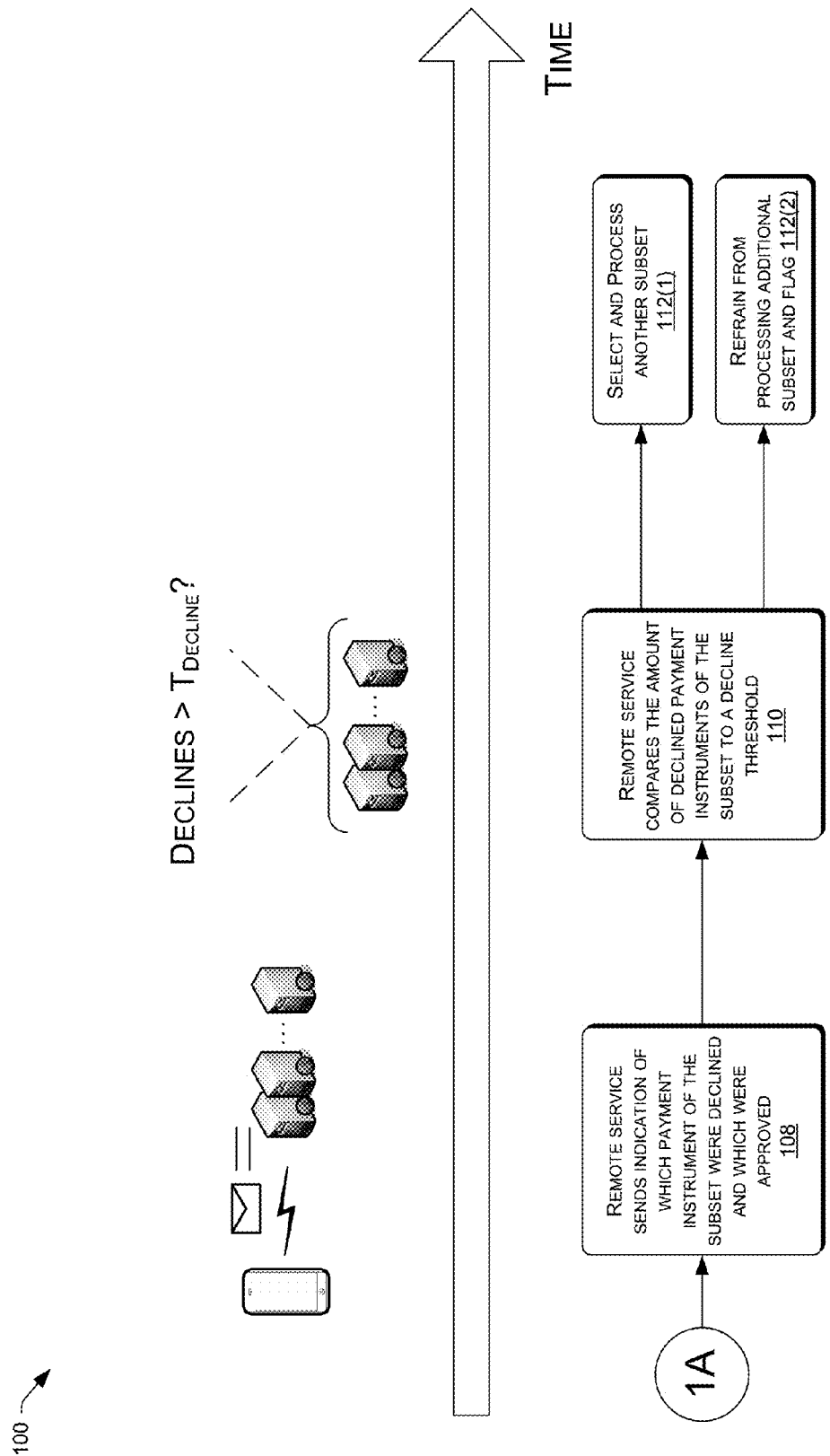

AUTOMATED FRAUD DETECTION FOR POINT-OF-SALE DEVICES

BACKGROUND

In today's commerce, merchants often utilize an array of different point-of-sale (POS) devices, including mobile POS devices. Merchants may use these mobile POS devices to engage in transactions with customers at different locations. For instance, a taxi driver may use a mobile POS device to charge a passenger for a taxi ride. In another example, a street vendor may use a mobile POS device to charge a customer for an item purchased from the street vendor. In some instances, these mobile POS devices are configured to operate in either an online mode or offline mode. In the latter instances, when an operator of a POS device "swipes" a payment instrument, information regarding the payment instrument and a corresponding transaction are stored locally on the POS device for later sending to a remote service for authorization of the payment instrument (after the POS device transitions back to the online mode).

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 1A-B collectively illustrate a process for detecting fraudulent transactions that occurred on a point-of-sale (POS) device when the device was in an offline mode.

DETAILED DESCRIPTION

Figure 1A:
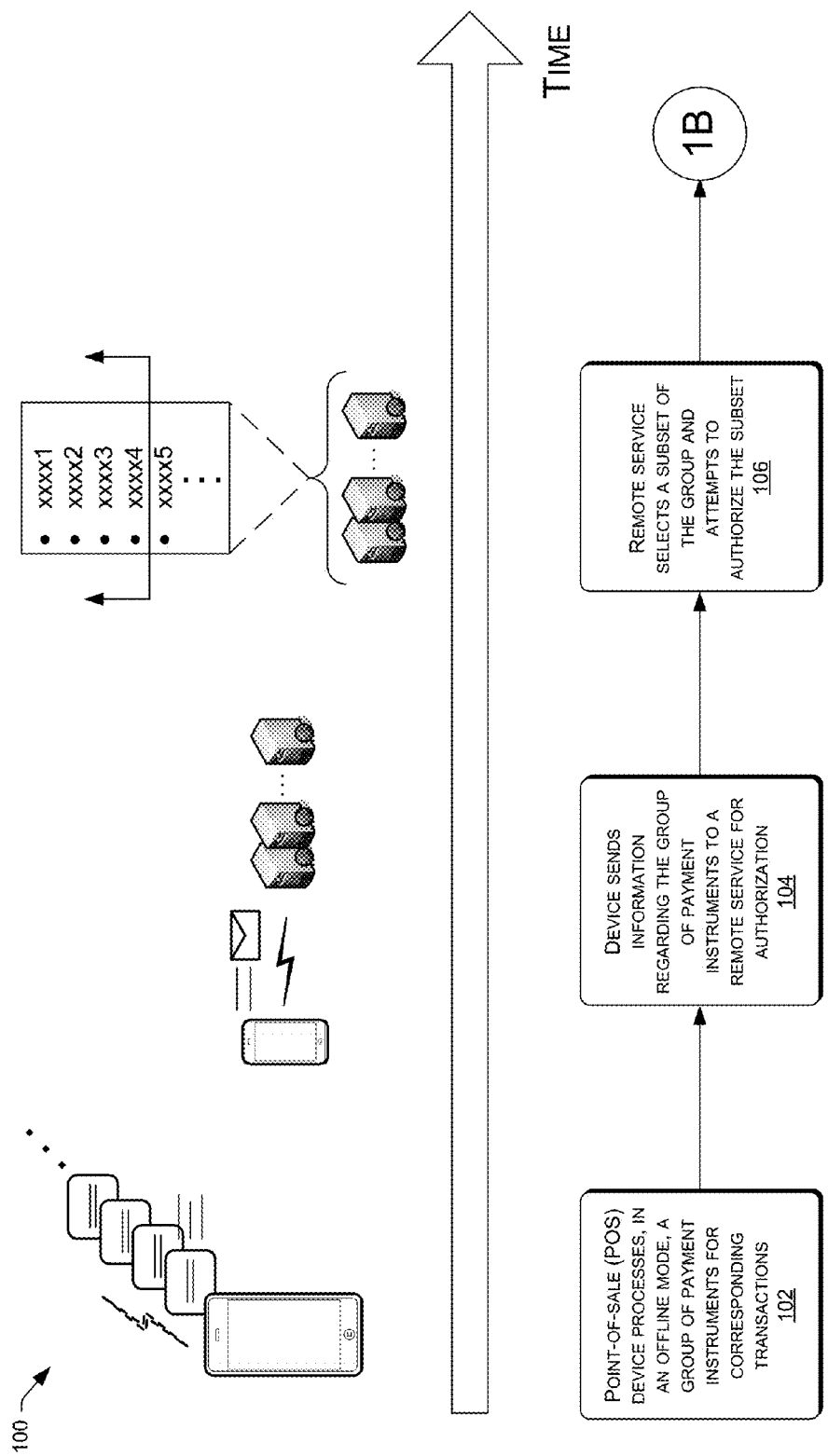

Some implementations described herein include techniques and arrangements for detecting fraudulent transactions made by a point-of-sale device (POS). In some instances, a POS device may operate by batching multiple authorization requests at a single time or in close temporal proximity to one another. In response to receiving a request to authorize a batch of payment instruments, a payment service may begin by selecting a subset of the batch to attempt to authorize, rather than simply proceeding to attempt to authorize the entire batch. For instance, in an example where the POS device provides a request to authorize three hundred transactions, a payment service may select fifty transactions to attempt to authorize (e.g., the first fifty in time, a random fifty, etc.).

After selecting the subset, the payment service may attempt to authorize each payment instrument associated with a respective transaction of the subset of transactions. This authorizing may include communicating with computing devices of a card payment network (e.g., MasterCard®, VISA®, etc.) and/or an issuing bank associated with a respective payment instrument to determine whether the payment instrument is authorized for the amount associated with the corresponding transaction.

After attempting to authorize the subset (e.g., the fifty transactions), the payment service may determine an amount of payment instruments of the subset that was declined. The payment service may then compare this amount to a threshold amount (e.g., a threshold decline percentage) to determine whether the subset indicates that the batch may be fraudulent (e.g., may include stolen or fictitious payment instruments). If the subset does not include an amount of declined payment instruments that is greater than the threshold, then the payment service may select another subset (e.g., of the same or similar size) and may repeat the process, and so forth until the batch is entirely processed (or deemed fraudulent along the way). In some instances, the payment service may attempt to authorize each remaining transaction of the entire batch after determining that the first subset is likely not fraudulent.

If, however, the amount of declined payment instruments is greater than the threshold, then the payment service may flag the transactions of the subset or the entire batch as potentially fraudulent and may cease or otherwise refrain from processing additional transactions of the batch. When a subset of batch is flagged as potentially fraudulent, the payment service may perform additional fraud analysis on the subset of the corresponding batch. This may include assigning a group of one or more human operators to manually analyze the subset or the batch to determine whether the subset or batch is fraudulent. Additionally or alternatively, the subsequent fraud analysis may include automated, computer-based fraud-detection techniques.

By refraining from processing subsequent transactions after determining that the batch may be fraudulent, the payment service may limit the amount of cards actually processed and may limit the negative results associated with declined cards. For instance, a nefarious operator of the POS device that sent the batch of authorization requests may receive limited information regarding which payment instruments of the batch are valid and which are not, as discussed in further detail below. In addition, utilization of these techniques results in fewer "fraudulent" requests to the card payment networks and/or issuing banks, given that the payment service ceases processing the batch after the identifying the subset as potentially fraudulent.

To conduct a transaction, an operator of a POS device—or "merchant"—may receive a payment instrument from a customer to pay for a good or service that the customer receives from the merchant. The merchant may then input an identifier associated with the payment instrument into a POS device by, for example, swiping the payment instrument, typing in a number of the payment instrument, or the like. When the POS device is operating in an online mode, the POS device sends information regarding the identifier of the payment instrument to a payment service for authorization of the payment instrument. In some instances, the POS device sends this information to the payment instrument substantially contemporaneously with the POS device receiving the identifier of the payment instrument. Usually after a short delay, the POS device may receive an indication of whether the payment instrument has been approved or declined for an amount of the transaction (i.e., a cost of the good or service).

In some instances, nefarious operators of POS devices may attempt to utilize the POS devices to determine which stolen or fictitious payment instruments from large batches of payment instruments are valid—and hence can be used again for the operator's benefit. For instance, a nefarious operator of a POS device may desire to "swipe" hundreds or thousands of stolen credit cards in order to receive indications from the payment service of which credit cards are valid. Because of the relatively instantaneous nature of online transactions, however, the nefarious operator of the POS device would struggle to successfully learn this information for a large batch of cards. That is, the payment service would likely identify fairly quickly that the authorization requests coming from the POS device of the nefarious operator are continually or often invalid—and hence may deduce that the operator is acting fraudulently and the payment service may cease processing authorization requests from the POS device and/or the operator.

The offline mode of a POS device, however, offers a potentially different scenario to the nefarious operator. When the POS device operates in the offline mode, the POS device locally stores the information regarding the identifier of the payment instrument for later sending to the payment service after the POS device transitions back into the online mode. POS devices of this nature may transition to this offline mode when the devices lose network connectivity (e.g., due to being at a location that lacks network connectivity) or in response to an operator manually transitioning to the offline mode using a merchant application executing on the device.

When the POS device transitions from the offline mode to the online mode, the POS device sends, to the payment service, all of the payment information it has stored, typically as a large batch. For instance, if the POS device has processed hundreds of transactions while in the offline mode, then the POS device may send a batch of authorization requests corresponding to these transactions to the payment service. Typically, the payment service would receive this batch of requests, attempt to authorize each payment instrument associated with each request, and send a result back to the POS device indicating which payment instruments were approved and which were declined. Because of the ability to receive this information for a very large group of payment instruments (i.e., which payment instruments are valid and which are invalid), the nefarious operator of the POS device may be tempted to "swipe" hundreds or even thousands of payment instruments while the POS device is in the offline mode, transition to the online mode for uploading the information regarding the alleged "transactions" and corresponding payment instruments, and receive an indication from the payment service of which payment instruments are valid and which are not. That is, the nefarious operator could potentially learn, for a very large batch of payment instruments, which are valid and may be used fraudulently by the operator at a later time.

To avoid this scenario, however, the techniques described herein process only a subset of a large batch of authorization requests, determine whether the subset appears fraudulent, and, if so, refrain from processing further payment instruments until further fraud analysis is performed on the subset. By doing so, a nefarious operator of a POS device would at most receive information regarding which payment instruments of the subset of payment instruments are valid and which are not—rather than receiving this information for the entire batch of transactions.

For discussion purposes, some example implementations are described below with reference to the corresponding figures. However, implementations herein are not limited to the particular examples provided, and may be extended to other environments, other system architectures, other types of merchants, and so forth, as will be apparent to those of skill in the art in light of the disclosure herein.

FIGS. 1A-B collectively illustrate a process 100 for detecting fraudulent transactions that occurred on a point-of-sale (POS) device when the device was in an offline mode.

FIG. 1A illustrates, at 102, a POS device processing, in an offline mode, a group of payment instruments used for corresponding transactions. That is, a merchant (or a nefarious user) associated with the POS device may have "swiped" or otherwise inputted information regarding payment instruments for multiple transactions. For instance, the merchant have swiped a first payment instrument for a first cost associated with a first transaction, a second payment instrument for a second cost associated with a second transaction, and so forth. When the merchant is acting for legitimate business reasons, the merchant may be receiving these payment instruments from customers in exchange for goods or services provided to the customers by the merchant. When the "merchant" is operating nefariously, the operator may be swiping stolen or otherwise invalid credit cards for the purpose of learning whether the cards are available for later use or whether they will be declined (and, hence, unavailable).

At 104, the POS device transitions from the offline mode to the online mode and, in response, sends information regarding the group of payment instruments over a network and to a remote service for authorization. For instance, the POS device may send a request to authorize each payment instrument of the group for an amount of each corresponding transaction.

At 106, the remote service selects a subset of the group to process and attempts to authorize payment instruments from this subset. In some instances, the remote service determines whether the group of transactions is greater than a threshold amount and, if so, determines to select a subset to process rather than the entire group. In other instances, the remote service may apply other heuristics to determine whether or not to process a subset, that is less than the entire group, rather than the entire group. These heuristics may include an average cost of the transactions, a diversity of the payment instruments used (i.e., a "bin diversity"), whether the POS device or "merchant" has previously been associated with a high decline rate, or the like. In some instances, a low bin diversity and an unusually low average or median transaction cost may raise suspicion of the validity of the transactions and, thus, increase the likelihood that the remote service will select a subset of the group for processing.

FIG. 1B continues the illustration of the process 100 and, at 108, the remote service sends an indication of which payment instruments were declined and which were approved to the POS device or to another computing device associated with the merchant. In some instances, the process 100 may refrain from performing this step until verifying that the subset has not been deemed potentially fraudulent. Or, regardless of whether the subset is deemed potentially fraudulent or not, the process 100 may provide the indication of 108 to the merchant any other time (e.g., after the operations 112(1) or 112(2)).

At 110, meanwhile, the remote service may then compare the amount of declined payment instruments of the subset to a decline threshold (e.g., a threshold percentage, a threshold number of declined payment instruments, etc.). If the amount of declined payment instruments of the subset is less than the threshold, then at 112(1) the remote service may select another subset of the group and may attempt to authorize these payment instruments. If, however, the amount of declined payment instruments is greater than the threshold, then at 112(2) the remote service refrains from processing additional transactions of the group and flags the subset and/or the group for subsequent fraud analysis. This may include algorithmic and automated fraud analysis, or fraud analysis by one or more human operators.

Figure 2:
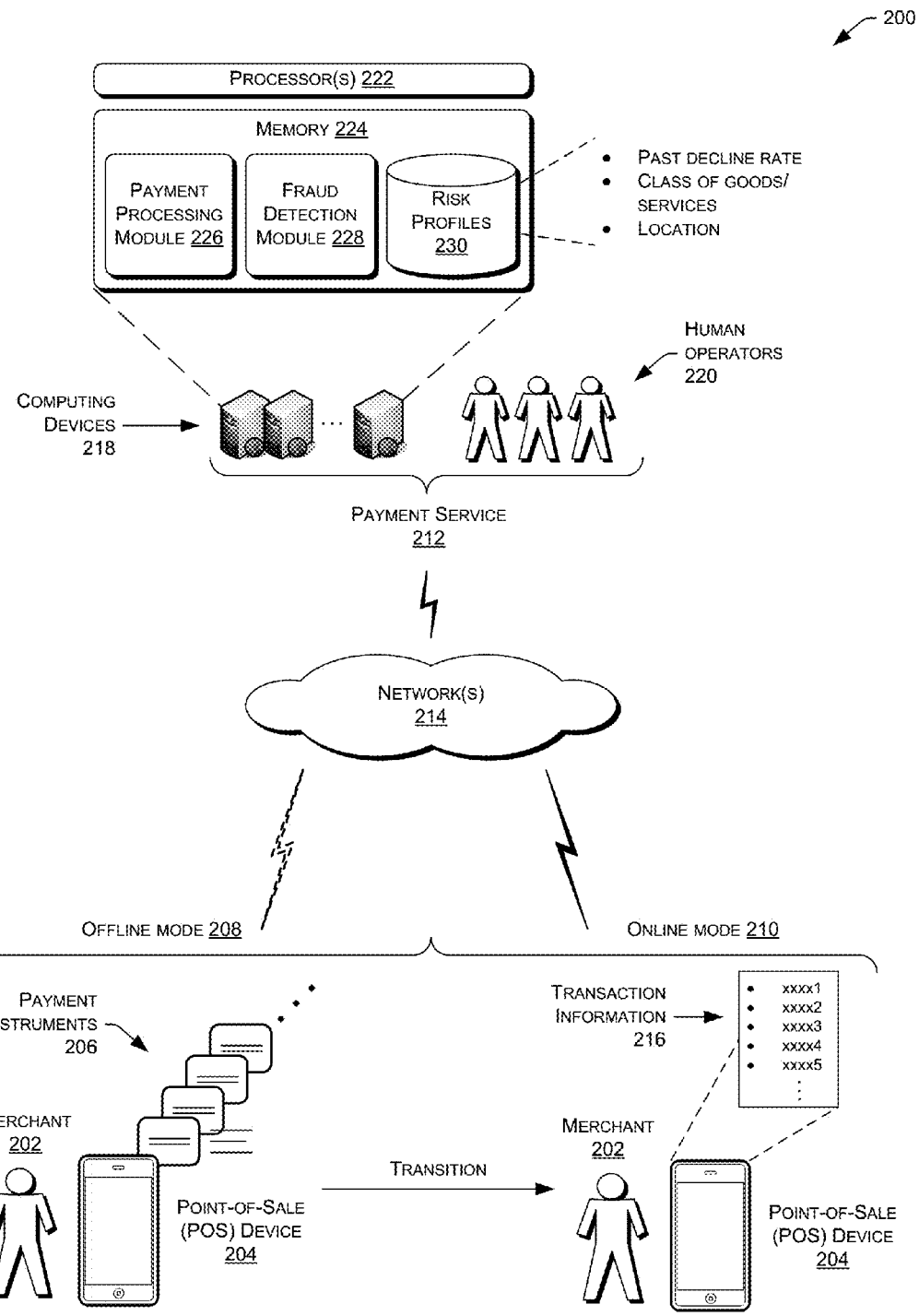
FIG. 2 illustrates an example environment that includes a merchant operating a mobile point-of-sale (POS) device to receive information associated with multiple payment instruments when the POS device is in the offline mode. After the POS device transitions to the online mode, the POS device uploads the information regarding the payment instruments. A payment service then analyzes a subset to determine whether the offline transactions appear fraudulent.

FIG. 2 illustrates an example environment 200 that includes a merchant 202 operating a point-of-sale (POS) device 204 to engage in various transactions using respective payment instruments 206. In legitimate transactions, the payment instruments 206 may be associated with respective customers, while in fraudulent transactions the "merchant" 202 may have obtained the payment instruments through improper means.

The POS device 204 may comprise any sort of mobile or non-mobile device that includes an instance of a merchant application that executes on the respective device. The merchant application may provide POS functionality to the POS device 204 to enable the merchant 202 (e.g., an owner, employees, individual user, etc.) to accept payments from the customers. In some types of businesses, the POS device 204 may correspond to a store or other place of business of the merchant, and thus, may be a fixed location that typically does not change on a day-to-day basis. In other types of businesses, however, the POS device 204 may change from time to time, such as in the case that the merchant operates a food truck, is a street vendor, a cab driver, etc., or has an otherwise mobile business, e.g., in the case of merchants who sell items at buyer's homes, places of business, and so forth.

As used herein, a merchant may include any business engaged in the offering of goods or services for acquisition by customers. Actions attributed to a merchant may include actions performed by owners, employees, or other agents of the merchant and thus no distinction is made herein unless specifically discussed. Additionally, a merchant, as used herein, may be a nefarious operator of a POS device who is acting as a "legitimate" merchant. In addition, as used herein, a customer may include any entity that acquires goods or services from a merchant, such as by purchasing, renting, leasing, borrowing, licensing, or the like. Hereinafter, goods and/or services offered by merchants may be referred to as items. Thus, a merchant and a customer may interact with each other to conduct a transaction in which the customer acquires an item from a merchant, and in return, the customer provides payment to the merchant.

As used herein, a transaction may include a financial transaction for the acquisition of goods and/or services that is conducted between a customer and a merchant, or any other type of transaction including a "merchant" charging a payment instrument fraudulently. In an example of a legitimate customer/merchant transaction, when paying for a transaction, the customer can provide the amount that is due to the merchant using a payment instrument (e.g., a debit card, a credit card, a stored-value or gift card, a check, through an electronic payment application on a device carried by the customer, or the like). The merchant can interact with the POS device 204 to process the transaction, such as by inputting (e.g., manually, via a magnetic card reader or an RFID reader, etc.) an identifier associated with the payment instrument. For example, a payment instrument of one of the customers may include one or more magnetic strips for providing card and customer information when swiped in a card reader. In other examples, other types of payment cards may be used, such as smart cards having a built-in memory chip, a radiofrequency identification tag, or so forth.

During a transaction, the POS device 204 can determine transaction information describing the transaction, such as the identifier of the payment instrument, an amount of payment received from the customer, the item(s) acquired by the customer, a time, place and date of the transaction, and so forth. The POS device 204 can send the transaction information to a payment service 212 over a network 214, either substantially contemporaneously with the conducting of the transaction (in the case of online transactions) or later when the device 204 is in the online mode (in the case offline transactions).

In an offline transaction, the POS device 204 may store one or more characteristics associated with the transaction (i.e., the transaction information), such as a cost of the transaction, a time of day at which the transaction occurred, a day of the week at which the transaction occurred, a location at which the transaction took place, an item that the customer obtained, and a payment instrument used in the transaction. After conducting an offline transaction with a customer, the POS device 204 may provide the stored information to the payment service 212 over the network 214 when the POS device is back online. The network 214 may represent any one or more wired or wireless networks, such as a WiFi network, a cellular network, or the like.

The POS device 204 may be configured to transition between an online mode 210 and an offline mode 208 (and vice versa) based on an array of different reasons such as a loss of network connectivity or the merchant 202 manually switching the POS device 204 between modes. In the illustrated example, the merchant 202 conducts numerous transactions on the POS device 204 while in the offline mode 208 by swiping or otherwise inputting information regarding respective payment instruments 206. These "transactions" may be legitimate transactions with customers, or may be nefarious transactions that the merchant 202 has engaged in for the purpose of learning which of the payment instruments 206 will be approved and, hence, may be used for later transactions (at the POS device 204 or otherwise).

At some point after swiping the payment instruments 206, the POS device 204 transitions from the offline mode 208 to the online mode 210. As illustrated, the POS device 204 stores transaction information 216, which includes information regarding the cost of each transaction, an identifier of the payment instrument used in the transaction and the like. After transitioning to the online mode, the POS device 204 may send one or more requests, containing the information 216, to the payment service 212 for authorizing the payment instruments.

As illustrated, the payment service 212 may include both one more computing devices 218 and one or more human operators 220. The computing devices 218 may be used to process requests to authorize payment instruments by, for example, communicating with computing devices of a card payment network, an issuing bank, or the like. In some instances, the computing devices 218 may flag certain groups of transactions as potentially fraudulent. In those instances, the human operators 220 may manually analyze the transactions to determine whether the transactions are indeed fraudulent. Of course, in other instances the computing devices 218 may additionally or alternatively perform this analysis.

The computing devices 218 include one or more processors 222 and memory 224, which may store a payment processing module 226, a fraud detection module 228, and risk profiles 230 corresponding to respective merchants. The payment processing module 226 may function to receive the information regarding transactions from the POS device 204 and attempt to authorize payment instruments used to conduct the transactions. The payment processing module 226 may then send one or more indications of whether the payment instrument(s) have been approved or declined back to the POS device 204.

Generally, when a customer and a merchant enter into an electronic payment transaction, the transaction is processed by electronically transferring funds from a financial account associated with the customer to a financial account associated with the merchant. As such, the payment processing module 226 may communicate with one or more computing devices of a card payment network, e.g., MasterCard®, VISA®, over the network 214 to conduct financial transactions electronically. The payment processing module 226 can also communicate with one or more computing devices of one or more banks over the network 214. For example, the payment processing module 226 may communicate with an acquiring bank, and/or an issuing bank, and/or a bank maintaining customer accounts for electronic payments.

An acquiring bank may be a registered member of a card association (e.g., Visa®, MasterCard®), and may be part of a card payment network. An issuing bank may issue credit cards to buyers, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the customer may use a debit card instead of a credit card, in which case, the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

The fraud detection module 228, meanwhile, determines when one or more transactions appear fraudulent. The fraud detection module 228 may utilize any known fraud detection techniques, as well as the additional techniques described herein. In some instances, when the fraud detection module 228 flags or designates one or more transactions as potentially fraudulent, the human operators 220 analyze the transaction(s) to make the final determination.

In some instances, in response to receiving a group of transactions that were conducted in the offline mode 208, the fraud detection module 228 may select a subset, that is less than the entire group, to process. The fraud detection module 228 may determine to select a subset rather than the entire group for an array of reasons. In some instances, each group of offline transactions may be processed in this manner. In other instances, groups of transactions that are greater than a threshold size may be processed. In still other instances, a risk profile associated with the POS device or the merchant that uploads the offline transactions may be used to determine whether to select a subset to process.

After the fraud detection module 228 selects a subset, the payment processing module 226 may then attempt to authorize payment instruments associated with the subset for the amounts of the corresponding transactions. The payment processing module 226 may then provide an indication of an amount of declined payment instruments of the subset and an amount of approved payment instruments to the fraud detection module 228. The fraud detection module 228 may then compare the amount of declined payment instruments of the subset to a decline threshold to determine whether to: (1) select another subset for processing, or (2) flag the subset and/or the entire group as potentially fraudulent and refrain from processing additional transactions of the group. In the latter instances, the human operators 220 may analyze the subset and/or the group to determine whether or not to continue processing the transactions of the group or whether they are indeed likely to be fraudulent.

In some instances, the fraud detection module 228 selects a size of the subset and/or a decline threshold with reference to a risk profile associated with a merchant that sends the request, such as the risk profile of the merchant 202. As illustrated, the risk profiles 230 may indicate a past decline rate of a merchant, a class or type of goods or services offered by the merchant, a location or geography of the merchant, or any other similar or different data that collectively determines a risk associated with the merchant. Generally, a risk profile indicating a relatively lower risk results in the fraud detection module 228 using a relatively higher decline threshold (given that the less risky merchant is given more deference) and vice versa. Similarly, a larger subset size may be chosen for a less risky merchant and vice versa—to limit the exposure caused by processing a large initial subset for a merchant that is deemed relatively risky compared to other merchants.

By processing a subset rather than the entire group of transactions, the techniques limit the amount of information provided back to the merchant 202 in the event that the group or subset is deemed fraudulent, given that the merchant will only learn about the success or failure of the payment instruments of the subset and not the entire group. In addition, by catching a fraudulent group (or batch) earlier in the process, the techniques limit the amount of fraudulent payment instruments processed at the card payment network, the issuing bank, and/or the like.

Figure 3:
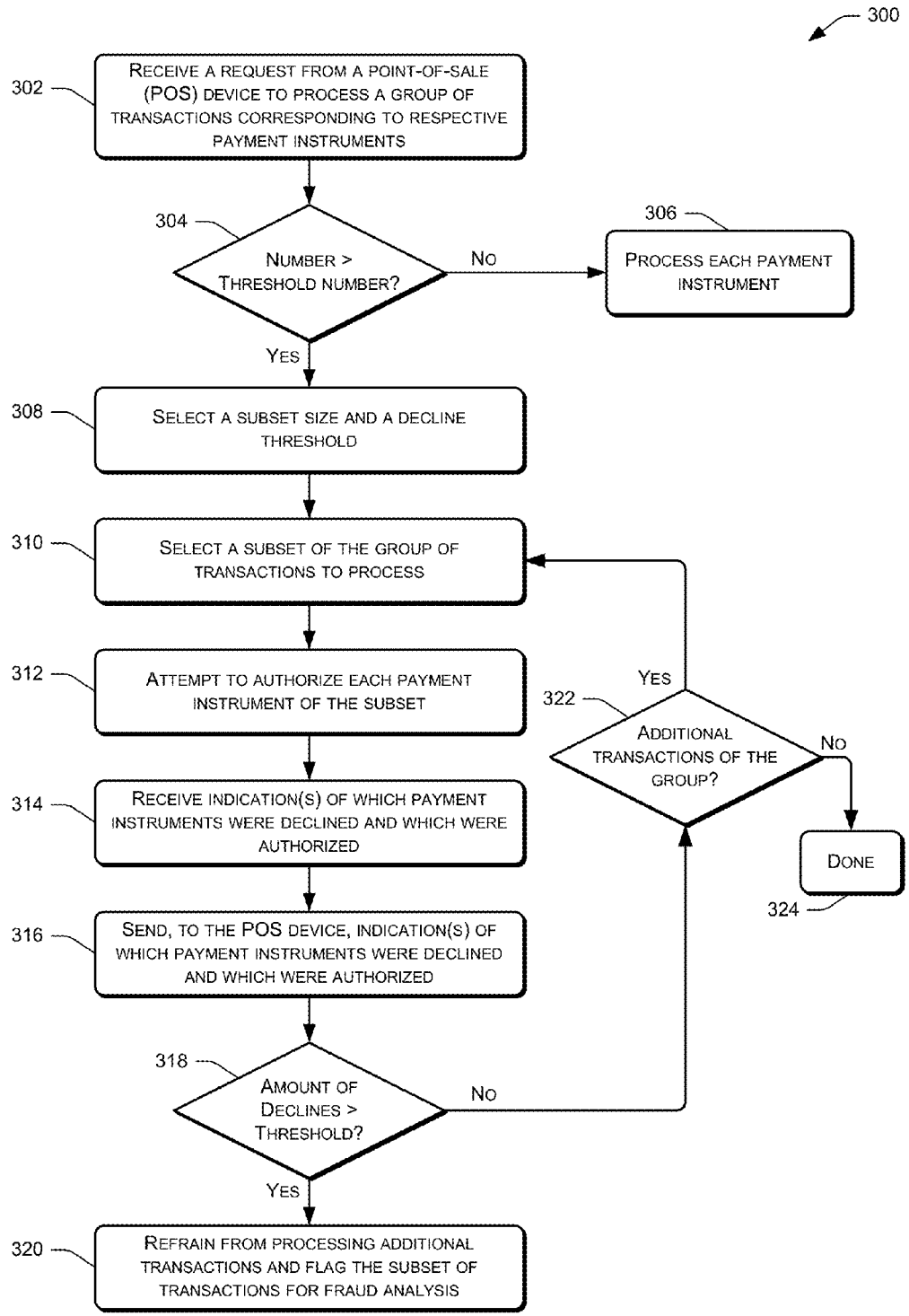
FIG. 3 illustrates a flow diagram of a process for detecting fraudulent transactions by analyzing a subset of a batch of transactions. If the subset is found to be potentially fraudulent, the process may refrain from processing other transactions of the batch.

FIG. 3 illustrates a flow diagram of a process 300 for detecting fraudulent transactions by analyzing a subset of a batch of transactions. If the subset is found to be potentially fraudulent, the process may refrain from processing other transactions of the batch.

The process 300 and other processes described herein are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. The process 300 may be performed by a POS device, by a remote payment service, by another entity, or by a combination thereof.

At 302, the process 300 receives a request from a POS device to process a group of transactions corresponding to respective payment instruments. In some instances, some or all of these transactions were processed while the POS device was in an offline mode.

At 304, the process 300 determines whether a number of the transactions in the group is greater than a threshold number. If not, then at 306 the process 300 processes each transaction of the group by attempting to authorize each payment instrument and sending an indication back to the POS device of whether each payment instrument has been approved or declined. While this example describes making this determination at 304 with reference to the number of transactions in the group, in other instances the process 300 may make the determination at 304 with reference to any other type of heuristics, such as a risk profile of the merchant, as discussed above.

If the number of transactions is greater than the threshold, then at 308, in this example, the process 300 selects a subset of the group to process as well as a decline threshold above which the process 300 will flag the subset as potentially fraudulent. In some instances, the subset size, the decline threshold, or both are selected with reference to a risk profile associated with the POS device and/or a merchant associated with the POS device.

At 310, the process 300 selects a subset of the transactions of the group to process and, at 312, attempts to authorize each payment instrument associated with the subset. This may include communicating with computing devices associated with a card payment network, an issuing bank, or the like. At 314, the process 300 receives indications of which payment instruments of the subset were approved (authorized for the cost of the respective transaction) and which were declined. At 316, the process 300 sends an indication of which payment instruments were approved and which were declined to the POS device or another computing device associated with the merchant. In some instances, the process 300 waits to send the indication until after determining that the subset has not been flagged as potentially fraudulent. In these instances, the process 300 may refrain from sending any indication of the success and failure of the payment instruments to the POS device when the subset is flagged as potentially fraudulent.

At 318, the process 300 determines whether the amount of declined payment instruments is greater than the threshold. If so, then at 320 the process 300 refrains from processing additional transactions of the group and flags the subset and/or group for further fraud analysis. In response, a group of human operators may analyze the subset and/or the group for fraud.

If, however, the amount of declined payment instruments is less than the threshold, then at 322 the process 300 may determine whether any additional transactions of the group remain for processing. If not, then at 324 the process 300 ends. If so, however, then the process 300 returns to the operation 310 and selects a subsequent subset for processing. The process 300 may continue until a subset is flagged as potentially fraudulent or until the process 300 has processed an entirety of the group of transactions.

Figure 4:
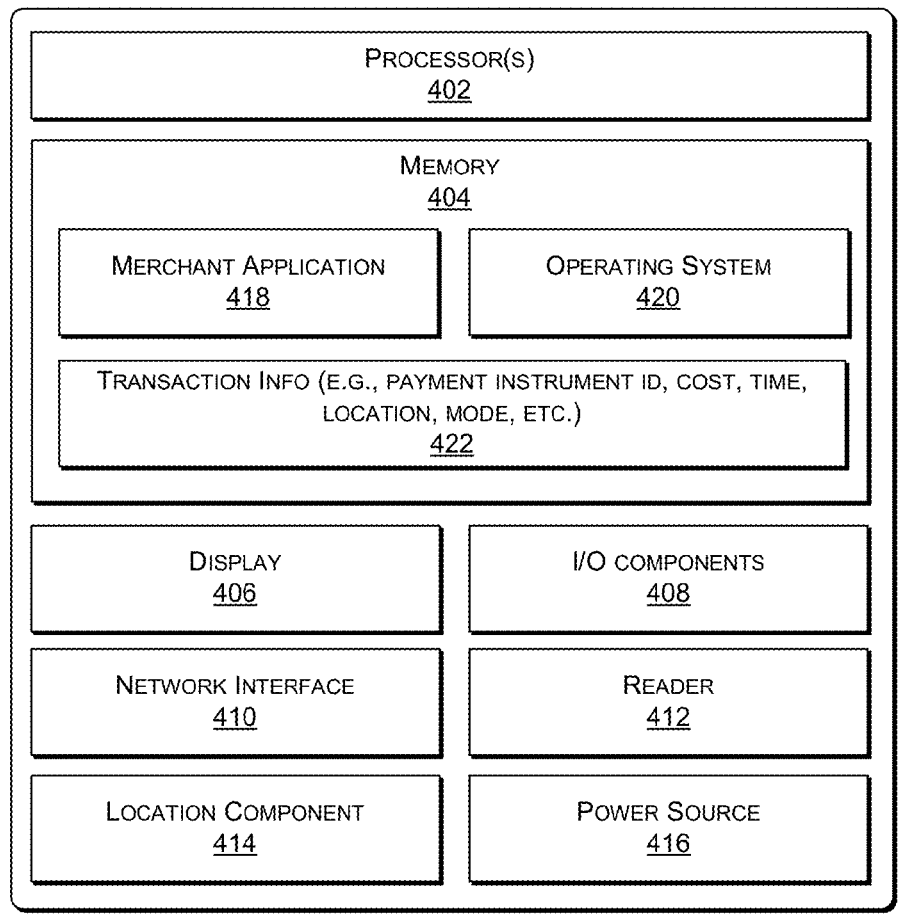
FIG. 4 illustrates select components of a POS device that a merchant described herein may utilize.

FIG. 4 illustrates select example components of an example POS device 400 according to some implementations. The POS device 400 may be any suitable type of computing device, e.g., mobile, semi-mobile, semi-stationary, or stationary. Some examples of the POS device 400 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the POS device 400 includes at least one processor 402, memory 404, a display 406, one or more input/output (I/O) components 408, one or more network interfaces 410, at least one card reader 412, at least one location component 414, and at least one power source 416. Each processor 402 may itself comprise one or more processors or processing cores. For example, the processor 402 can be implemented as one or more microprocessors, microcomputers, microcontrollers, digital signal processors, central processing units, state machines, logic circuitries, and/or any devices that manipulate signals based on operational instructions. In some cases, the processor 402 may be one or more hardware processors and/or logic circuits of any suitable type specifically programmed or configured to execute the algorithms and processes described herein. The processor 402 can be configured to fetch and execute computer-readable processor-executable instructions stored in the memory 404.

Depending on the configuration of the POS device 400, the memory 404 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 404 may include, but is not limited to, RAM, ROM, EEPROM, flash memory, solid-state storage, magnetic disk storage, optical storage, and/or other computer-readable media technology. Further, in some cases, the POS device 400 may access external storage, such as RAID storage systems, storage arrays, network attached storage, storage area networks, cloud storage, or any other medium that can be used to store information and that can be accessed by the processor 402 directly or through another computing device or network. Accordingly, the memory 404 may be computer storage media able to store instructions, modules or components that may be executed by the processor 402. Further, when mentioned, non-transitory computer-readable media exclude media such as energy, carrier signals, electromagnetic waves, and signals per se.

The memory 404 may be used to store and maintain any number of functional components that are executable by the processor 402. In some implementations, these functional components comprise instructions or programs that are executable by the processor 402 and that, when executed, implement operational logic for performing the actions and services attributed above to the POS device 400. Functional components of the POS device 400 stored in the memory 404 may include a merchant application 418, discussed above. The merchant application 418 may present an interface on the POS device 400 to enable the merchant to conduct transactions, transition between the offline and online modes, receive payments, and so forth, as well as communicating with the payment service 102 for processing payments and sending transaction information. Further, the merchant application 418 may present an interface to enable the merchant to manage the merchant's account, and the like. Additional functional components may include an operating system 420 for controlling and managing various functions of the POS device 400 and for enabling basic user interactions with the POS device 400. The memory 404 may also store transaction data 422 that is received based on the merchant associated with the POS device 400 engaging in various transactions with customers.

In addition, the memory 404 may also store data, data structures and the like, that are used by the functional components. For example, this data may include item information that includes information about the items offered by the merchant, which may include images of the items, descriptions of the items, prices of the items, and so forth. Depending on the type of the POS device 400, the memory 404 may also optionally include other functional components and data, which may include programs, drivers, etc., and the data used or generated by the functional components. Further, the POS device 400 may include many other logical, programmatic and physical components, of which those described are merely examples that are related to the discussion herein.

The network interface(s) 410 may include one or more interfaces and hardware components for enabling communication with various other devices over the network or directly. For example, network interface(s) 410 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 4 further illustrates that the POS device 400 may include the display 406 mentioned above. Depending on the type of computing device used as the POS device 400, the display 406 may employ any suitable display technology. For example, the display 406 may be a liquid crystal display, a plasma display, a light emitting diode display, an OLED (organic light-emitting diode) display, an electronic paper display, or any other suitable type of display able to present digital content thereon. In some examples, the display 406 may have a touch sensor associated with the display 406 to provide a touchscreen display configured to receive touch inputs for enabling interaction with a graphic interface presented on the display 406. Accordingly, implementations herein are not limited to any particular display technology. Alternatively, in some examples, the POS device 400 may not include the display 406, and information may be present by other means, such as aurally.

The I/O components 408, meanwhile, may include speakers, a microphone, a camera, and various user controls (e.g., buttons, a joystick, a keyboard, a keypad, etc.), a haptic output device, and so forth.

In addition, the POS device 400 may include or may be connectable to a payment instrument reader 412. In some examples, the reader 412 may plug in to a port in the merchant device, such as a microphone/headphone port, a data port, or other suitable port. In other instances, the reader 412 is integral with the entire POS device 400. The reader may include a read head for reading a magnetic strip of a payment card, and further may include encryption technology for encrypting the information read from the magnetic strip. Alternatively, numerous other types of card readers may be employed with the POS devices 400 herein, depending on the type and configuration of a particular POS device 400.

The location component 414 may include a GPS device able to indicate location information, or the location component 414 may comprise another other location-based sensor. The POS device 400 may also include one or more additional sensors (not shown), such as an accelerometer, gyroscope, compass, proximity sensor, and the like. Additionally, the POS device 400 may include various other components that are not shown, examples of which include removable storage, a power control unit, and so forth.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. An automated fraud-detection system configured to designate a group of transactions as potentially fraudulent without analyzing each individual transaction of the group of transactions, the automated fraud-detection system comprising:

a mobile point-of-sale (POS) device, the mobile POS device comprising:
  a card reader;
  a processor; and
  a computer-readable media storing first instructions executable by the processor, wherein the first instructions program the processor to:
    store, while the mobile POS device is in an offline mode with respect to a remote transaction processing service, data associated with the group of transactions, wherein each respective transaction of the group of transactions is associated with: (i) payment information read by the card reader from a payment instrument, and (ii) a cost of the respective transaction;
    transition from the offline mode to an online mode with respect to the remote transaction processing service;
    based on least in part on transitioning to the online mode, send, to the remote transaction processing service, an indication of the group of transactions;
    send, to the remote transaction processing service, a request to process the group of transactions; and
    receive, from the remote transaction processing service, an indication of which payment instruments associated with a subset of transactions from the group of transactions were authorized and which of the payment instruments associated with the subset were declined; and
the remote transaction processing system, the remote transaction processing system comprising:
  one or more processors; and
  one or more computer-readable media storing second instructions executable by the one or more processors, wherein the second instructions program the one or more processors to:
    receive, from the mobile POS device, the indication of the group of transactions;
    receive the request from the mobile POS device to process the group of transactions;
    select, from the group of transactions, the subset to process, the subset being less than the group of the transactions;
    attempt to authorize, by communicating with one or more computing devices associated with one or more card payment networks and for each respective transaction of the subset, the payment instrument for the cost of the respective transaction of the subset;
    send, to the mobile POS device, the indication of which of the payment instruments associated with the subset were authorized and which of the payment instruments associated with the subset were declined;

determine a decline metric based at least in part on a number of the payment instruments associated with the subset that were declined;

compare the decline metric to a decline threshold;

at least partly in response to determining that the decline metric is less than the decline threshold, select, from the group of transactions, another subset of transactions to process; and at least partly in response to determining that the decline metric is greater than the decline threshold:

refrain from processing additional transactions of the group of transactions;

designate the group of transactions as potentially fraudulent without having processed each transaction of the group of transactions; and flag at least the transactions of the subset of the group of transactions for subsequent automated fraud analysis.

2. A system as recited in claim 1, wherein the second instructions further program the one or more processors to flag at least the transactions of the subset of the group of transactions for fraud analysis by a human operator.

3. A system as recited in claim 1, wherein the first instructions further program the processor to:

process transactions in the offline mode and the online mode, wherein each transaction of the group of transactions was processed at the mobile POS device when the mobile POS device was in the offline mode.

4. A system as recited in claim 3, wherein:

processing a first transaction at the mobile POS device when the mobile POS device is in the offline mode comprises storing, at the mobile POS device and for later sending to the remote transaction processing system, data associated with the first transaction; and processing a second transaction at the mobile POS device when the mobile POS device is in the online mode comprises sending, to the remote transaction processing system for authorization of a payment instrument used to satisfy a cost of the second transaction, information regarding the payment instrument used to satisfy the cost of the second transaction, the sending occurring substantially contemporaneously with the mobile POS device receiving the information regarding the payment instrument used to satisfy the cost of the second transaction.

5. An automated fraud-detection system configured to designate a group of transactions as potentially fraudulent without analyzing each individual transaction of the group of transactions, the automated fraud-detection system comprising:

a computing device, the computing device comprising:

a card reader;

a processor; and a computer-readable media storing first computer-executable instructions that, when executed, cause the processor to perform first acts comprising:

store, while the computing device is in an offline mode with respect to a remote transaction processing service, data associated with the group of transactions, wherein each respective transaction of the group of transactions is associated with: (i) payment information read by the card reader from a payment instrument, and (ii) a cost of the respective transaction;

transition from the offline mode to an online mode with respect to the remote transaction processing service;

based on least in part on transitioning to the online mode, send, to the remote transaction processing service, an indication of the group of transactions;

send, to the remote transaction processing service, one or more requests to process the group of transactions; and receive, from the remote transaction processing service, an indication of which payment instruments associated with a subset of transactions from the group of transactions were authorized and which of the payment instruments associated with the subset were declined; and the remote transaction processing system, the remote transaction processing system comprising:

one or more processors; and one or more computer-readable media storing second computer-executable instructions that, when executed, cause the one or more processors to perform second acts comprising:

receiving, from the computing device, the indication of the group of transactions;

receiving the one or more requests to process the group of transactions;

selecting the subset of the group of transactions;

attempting to authorize, by communicating with one or more computing devices associated with one or more card payment networks, the payment instruments of the subset;

determining which of the payment instruments of the subset, if any, have been successfully authorized and which of the payment instruments of the subset, if any, have been declined; and at least partly in response determining that a threshold amount of the payment instruments of the subset have been declined:

designating the group of transactions as potentially fraudulent without having processed each transaction of the group of transactions;

flagging at least a portion of the transactions of the subset for fraud analysis; and refraining from attempting to authorize at least one payment instrument associated with a transaction of a remainder of the group of transactions.

6. A system as recited in claim 5, the second acts further comprising providing, to the computing device, one or more indications of which of the payment instruments, if any, of the subset were successfully authorized and which of the payment instruments of the subset, if any, were declined.

7. A system as recited in claim 5, wherein the subset comprises a first subset, and the second acts further comprising:

at least partly in response determining that less than the threshold amount of the payment instruments of the subset have been declined:

selecting a second subset of the group of transactions; and attempting to authorize payment instruments of the second subset.

8. A system as recited in claim 7, the second acts further comprising:

determining which of the payment instruments of the second subset, if any, have been successfully authorized and which of the payment instruments of the second subset, if any, have been declined;
at least partly in response determining that a threshold amount of the payment instruments of the second subset have been declined:
flagging at least a portion of the transactions of the second subset for fraud analysis; and
refraining from attempting to authorize at least one payment instrument associated with a transaction of a remainder of the group of transactions.

9. A system as recited in claim 5, the second acts further comprising:
determining a risk profile associated with a merchant associated with the one or more requests; and
determining a size of the subset based at least in part on the risk profile associated with the merchant.

10. A system as recited in claim 9, wherein the risk profile associated with the merchant is based on at least one of:
an average or median decline rate for previous transactions at the merchant;
a class of goods or services offered by the merchant; or
a geography associated with the merchant.

11. A system as recited in claim 5, the second acts further comprising:
determining a risk profile associated with a merchant associated with the one or more requests; and
determining the threshold amount based at least in part on the risk profile associated with the merchant.

12. A system as recited in claim 5, wherein the subsequent fraud analysis comprises fraud analysis of at least a portion of the subset by a human operator.

13. A system as recited in claim 5, wherein the refraining comprises refraining from attempting to authorize each other payment instrument associated with a respective transaction of the remainder of the group of transactions.

14. A system as recited in claim 5, wherein the threshold amount comprises at least one of: a threshold number of payment instruments that have been declined; or a threshold percent of payment instruments that have been declined relative to a total number of transactions or relative to a number of payment instruments that were not declined.

15. A method for performing automated fraud-detection to designate a group of transactions as potentially fraudulent without analyzing each individual transaction of the group of transactions, the method comprising:
storing, at a mobile point-of-sale (POS) device using a card reader, and while the mobile POS device is in an offline mode with respect to a remote transaction processing service, data associated with the group of transactions, wherein each respective transaction of the group of transactions is associated with: (i) payment information read by the card reader from a payment instrument, and (ii) a cost of the respective transaction;
transitioning the mobile POS device from the offline mode to an online mode with respect to the remote transaction processing service;
based on least in part on transitioning to the online mode, sending, from the mobile POS device and to the remote transaction processing service, an indication of the group of transaction;
receiving, by the remote transaction processing service and from the mobile POS device, the indication of the group of transactions;
sending, from the mobile POS device and to the remote transaction processing service, a request to authorize respective payment instruments associated with the group of transactions;
receiving, by the remote transaction processing service and from the mobile POS device, the request to authorize respective payment instruments associated with the group of transactions;
attempting to authorize, by the remote transaction processing service communicating with one or more computing devices associated with one or more card payment networks, a first subset of one or more payment instruments associated with the group of transactions;
attempting, at least partly in response to determining that an amount of payment instruments of the first subset that has been approved is greater than or equal to a threshold, to authorize, by the remote transaction processing service communicating with the one or more computing devices associated with the one or more card payment networks, a second subset of one or more payment instruments associated with the group of transactions; and
at least partly in response to determining that the amount of payment instruments of the first subset that has been approved is less than the threshold:
designating at least some of the group of transactions as potentially fraudulent without having processed each transaction of the group of transactions; and
refraining from authorizing additional payment instruments associated with the group of transactions.

16. A method as recited in claim 15, further comprising providing, by the remote transaction processing system and to the mobile POS device, an indication of which of the one or more payment instruments, if any, of the first subset were approved and which of the one or more payment instruments, if any, of the first subset were declined.

17. A method as recited in claim 15, further comprising flagging, by the remote transaction processing system, and at least partly in response to determining that the amount of payment instruments of the first subset that has been approved is less than the threshold, at least a portion of the one or more payment instruments associated with the first subset for fraud analysis.

18. A method as recited in claim 15, further comprising:
determining, by the remote transaction processing system, a risk profile associated with the mobile POS device; and
selecting by the remote transaction processing system, a size of the first subset based at least in part on the risk profile.

19. A method as recited in claim 15, further comprising:
determining, by the remote transaction processing system, a risk profile associated with the mobile POS device; and
selecting, by the remote transaction processing system, the threshold based at least in part on the risk profile.

20. A method as recited in claim 19, wherein the risk profile is based on at least one of:
an average or median decline rate for previous transactions conducted at the mobile POS device;
a class of goods or services offered by a merchant associated with the mobile POS device; or
a geography associated with the merchant.

* * * * *

UNITED STATES PATENT AND TRADEMARK OFFICE
CERTIFICATE OF CORRECTION

PATENT NO.           : 9,626,679 B2
APPLICATION NO.      : 14/292098
DATED                : April 18, 2017
INVENTOR(S)          : Jevin Bhorania et al.

It is certified that error appears in the above-identified patent and that said Letters Patent is hereby corrected as shown below:

On the Title Page

Item (73), add "Assignee: Square, Inc., San Francisco, CA (US)"

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*